US010854025B2

(12) United States Patent
Einberg et al.

(10) Patent No.: US 10,854,025 B2
(45) Date of Patent: Dec. 1, 2020

(54) WEARABLE DISCOVERY FOR AUTHENTICATION

(71) Applicant: ASSA ABLOY AB, Stockholm (SE)

(72) Inventors: Fredrik Carl Stefan Einberg, Huddinge (SE); Daniel Berg, Sundbyberg (SE); Philip Hoyer, Richmond (GB)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 15/569,196

(22) PCT Filed: May 2, 2016

(86) PCT No.: PCT/EP2016/059754
§ 371 (c)(1),
(2) Date: Oct. 25, 2017

(87) PCT Pub. No.: WO2016/177673
PCT Pub. Date: Nov. 10, 2016

(65) Prior Publication Data
US 2018/0115897 A1    Apr. 26, 2018

Related U.S. Application Data

(60) Provisional application No. 62/198,240, filed on Jul. 29, 2015, provisional application No. 62/197,985, (Continued)

(51) Int. Cl.
*H04L 29/06*     (2006.01)
*G07C 9/00*     (2020.01)
(Continued)

(52) U.S. Cl.
CPC ......... *G07C 9/00309* (2013.01); *G06F 1/163* (2013.01); *G07C 9/00174* (2013.01);
(Continued)

(58) Field of Classification Search
CPC ... H04L 63/08; H04L 63/083; H04L 63/0853; H04L 63/0861; H04L 63/0876; H04L 63/105; H04L 63/108
See application file for complete search history.

(56) References Cited

U.S. PATENT DOCUMENTS 6,374,356 B1    4/2002   Daigneault et al.
6,719,200 B1    4/2004   Wiebe
(Continued)

FOREIGN PATENT DOCUMENTS

CN      101272251      9/2008
EP      1 710 974 A1   10/2006
(Continued)

OTHER PUBLICATIONS

Till Ballendat et al., Proxemic Interaction: Designing for a Proximity and Orientation-Aware Environment, Nov. 7-10, 2010, ACM, pp. 121-130. (Year: 2010).*
(Continued)

*Primary Examiner* — Luu T Pham
*Assistant Examiner* — Fahimeh Mohammadi
(74) *Attorney, Agent, or Firm* — Sheridan Ross P.C.

(57) ABSTRACT

An access control system is described in which a credential may be authenticated and permitted to access a protected resource only after discovery of a second device. Requiring discovery of a second device prior to authentication enhances security by protecting against unauthorized access by an illicit user of a credential.

19 Claims, 6 Drawing Sheets

Related U.S. Application Data filed on Jul. 28, 2015, provisional application No. 62/197,945, filed on Jul. 28, 2015, provisional application No. 62/167,136, filed on May 27, 2015, provisional application No. 62/167,172, filed on May 27, 2015, provisional application No. 62/164,099, filed on May 20, 2015, provisional application No. 62/162,273, filed on May 15, 2015, provisional application No. 62/161,640, filed on May 14, 2015, provisional application No. 62/156,035, filed on May 1, 2015, provisional application No. 62/156,030, filed on May 1, 2015.

(51) Int. Cl.

| | | |
|---|---|---|
| H04W 12/08 | (2009.01) | |
| H04L 9/32 | (2006.01) | |
| H04W 12/06 | (2009.01) | |
| G07C 9/28 | (2020.01) | |
| G07C 9/25 | (2020.01) | |
| G08B 7/06 | (2006.01) | |
| G08B 25/01 | (2006.01) | |
| H04W 12/04 | (2009.01) | |
| G06F 1/16 | (2006.01) | |
| H04B 1/3827 | (2015.01) | |
| G06F 21/34 | (2013.01) | |
| H04W 4/80 | (2018.01) | |
| H04W 12/00 | (2009.01) | |
| G06K 9/00 | (2006.01) | |
| H04W 88/02 | (2009.01) | |

(52) U.S. Cl.
CPC ......... *G07C 9/00571* (2013.01); *G07C 9/257* (2020.01); *G07C 9/28* (2020.01); *G08B 7/066* (2013.01); *G08B 25/016* (2013.01); *H04B 1/385* (2013.01); *H04L 9/3226* (2013.01); *H04L 63/0428* (2013.01); *H04L 63/062* (2013.01); *H04L 63/083* (2013.01); *H04L 63/0853* (2013.01); *H04L 63/0861* (2013.01); *H04L 63/0876* (2013.01); *H04L 63/108* (2013.01); *H04W 12/04* (2013.01); *H04W 12/06* (2013.01); *H04W 12/08* (2013.01); *G06F 21/34* (2013.01); *G06K 9/00885* (2013.01); *G07C 9/00563* (2013.01); *G07C 2009/00769* (2013.01); *H04L 2463/121* (2013.01); *H04W 4/80* (2018.02); *H04W 12/00503* (2019.01); *H04W 12/00508* (2019.01); *H04W 88/02* (2013.01)

(56) References Cited

U.S. PATENT DOCUMENTS

| | | | |
|---|---|---|---|
| 6,766,450 | B2 | 7/2004 | Micali |
| 7,706,778 | B2 | 4/2010 | Lowe |
| 8,074,271 | B2 | 12/2011 | Davis et al. |
| 8,184,983 | B1* | 5/2012 | Ho .................. H04B 11/00 345/156 |
| 9,269,208 | B2 | 2/2016 | Burke |
| 9,280,860 | B2 | 3/2016 | Malhotra et al. |
| 9,344,436 | B1* | 5/2016 | Sheng .................. H04W 4/021 |
| 9,672,727 | B1 | 6/2017 | Alexander et al. |
| 9,779,568 | B2* | 10/2017 | Shibutani .............. E05B 47/00 |
| 9,942,222 | B1* | 4/2018 | Fenton .............. H04L 63/0853 |
| 2002/0178385 | A1 | 11/2002 | Dent et al. |
| 2003/0141977 | A1 | 7/2003 | Brown et al. |
| 2003/0144952 | A1 | 7/2003 | Brown et al. |
| 2005/0151640 | A1 | 7/2005 | Hastings |
| 2007/0024417 | A1 | 2/2007 | Gerstenkorn |
| 2007/0204349 | A1* | 8/2007 | Sparks .................. G06Q 30/06 726/27 |
| 2008/0068183 | A1 | 3/2008 | Diamant |
| 2008/0089521 | A1 | 4/2008 | Le Saint et al. |
| 2008/0284564 | A1 | 11/2008 | Leitch |
| 2010/0122350 | A1 | 5/2010 | Munje et al. |
| 2010/0274100 | A1 | 10/2010 | Behar et al. |
| 2010/0304716 | A1* | 12/2010 | Hoeksel .............. H04W 12/06 455/411 |
| 2011/0214158 | A1* | 9/2011 | Pasquero .............. H04B 5/00 726/2 |
| 2012/0112901 | A1 | 5/2012 | Chasko |
| 2012/0126940 | A1 | 5/2012 | Coggill |
| 2012/0167232 | A1* | 6/2012 | Moosavi .............. H04W 12/06 726/29 |
| 2012/0311675 | A1* | 12/2012 | Ham .................. G06F 21/121 726/4 |
| 2013/0015947 | A1 | 1/2013 | Best |
| 2013/0024374 | A1 | 1/2013 | Weiss |
| 2013/0044055 | A1 | 2/2013 | Karmarkar et al. |
| 2013/0060577 | A1 | 3/2013 | Debusk et al. |
| 2013/0086375 | A1 | 4/2013 | Lyne et al. |
| 2013/0091561 | A1 | 4/2013 | Brusso et al. |
| 2013/0095802 | A1 | 4/2013 | Wang |
| 2013/0124855 | A1 | 5/2013 | Varadarajan et al. |
| 2013/0212248 | A1* | 8/2013 | Neafsey .............. H04L 63/08 709/223 |
| 2013/0257613 | A1 | 10/2013 | Jarman et al. |
| 2013/0324081 | A1 | 12/2013 | Gargi et al. |
| 2014/0056220 | A1* | 2/2014 | Poitau .................. H04W 76/14 370/328 |
| 2014/0091903 | A1 | 4/2014 | Birkel et al. |
| 2014/0120905 | A1 | 5/2014 | Kim |
| 2014/0165165 | A1 | 6/2014 | Story, Jr. |
| 2014/0173690 | A1* | 6/2014 | Ekberg .................. H04L 63/08 726/3 |
| 2014/0197948 | A1* | 7/2014 | Mo ....................... H04W 64/00 340/539.13 |
| 2014/0225713 | A1 | 8/2014 | McIntyre et al. |
| 2014/0282877 | A1 | 9/2014 | Mahaffey et al. |
| 2014/0282927 | A1 | 9/2014 | McLaughlin et al. |
| 2014/0341441 | A1 | 11/2014 | Slaby et al. |
| 2014/0359722 | A1 | 12/2014 | Shultz et al. |
| 2014/0373111 | A1 | 12/2014 | Moss et al. |
| 2015/0017979 | A1* | 1/2015 | Kang .................. H04W 8/005 455/426.1 |
| 2015/0028996 | A1 | 1/2015 | Agrafioti et al. |
| 2015/0067803 | A1 | 3/2015 | Alduaiji |
| 2015/0121465 | A1 | 4/2015 | Berns et al. |
| 2015/0140964 | A1 | 5/2015 | Horton |
| 2015/0161876 | A1 | 6/2015 | Castillo |
| 2015/0172897 | A1 | 6/2015 | Mariathasan et al. |
| 2015/0309767 | A1 | 10/2015 | Osoinach et al. |
| 2016/0036965 | A1 | 2/2016 | Kim |
| 2016/0165450 | A1 | 6/2016 | Hunt et al. |
| 2016/0274556 | A1 | 9/2016 | Murphy |
| 2016/0283737 | A1 | 9/2016 | Soman et al. |
| 2016/0359864 | A1 | 12/2016 | Dhaliwal et al. |
| 2017/0208464 | A1 | 7/2017 | Guertler et al. |
| 2017/0220791 | A1 | 8/2017 | Shibutani et al. |

FOREIGN PATENT DOCUMENTS

| | | |
|---|---|---|
| EP | 1760671 | 3/2007 |
| EP | 1895445 | 3/2008 |
| EP | 1 926 038 A1 | 5/2008 |
| EP | 2434461 | 3/2012 |
| EP | 2469816 | 6/2012 |
| EP | 2493232 | 8/2012 |
| EP | 2620919 | 7/2013 |
| EP | 2809046 | 12/2014 |
| GB | 2402840 | 12/2004 |
| WO | WO 2004/025545 | 3/2004 |
| WO | WO 2005/024549 | 3/2005 |
| WO | WO 2007/121414 | 10/2007 |
| WO | WO 2009/089208 | 7/2009 |
| WO | WO 2009/127984 A1 | 10/2009 |
| WO | WO 2009/143415 | 11/2009 |

(56) References Cited

FOREIGN PATENT DOCUMENTS

| WO | WO 2012/113080 | 8/2012 |
|---|---|---|
| WO | WO 2013/118454 | 8/2013 |
| WO | WO 2014/098755 | 6/2014 |
| WO | WO 2014/172325 | 10/2014 |
| WO | WO 2014/191537 | 12/2014 |
| WO | WO 2015/048349 | 4/2015 |
| WO | WO 2016/177666 | 11/2016 |
| WO | WO 2016/177668 | 11/2016 |
| WO | WO 2016/177669 | 11/2016 |
| WO | WO 2016/177671 | 11/2016 |
| WO | WO 2016/177672 | 11/2016 |
| WO | WO 2016/177674 | 11/2016 |
| WO | WO 2016/178081 | 11/2016 |
| WO | WO 2016/178082 | 11/2016 |
| WO | WO 2016/178085 | 11/2016 |

OTHER PUBLICATIONS

Jacob Sorber et al., An Amulet for Trustworthy Wearable mHealth, Feb. 2012, ACM, pp. 1-6. (Year: 2012).*
Tam Vu et al., Personal TouchIdentification Tokens, Apr.-Jun. 2013, IEEE, vol. 12, Issue: 2, pp. 10-13. (Year: 2013).*
Fidel Paniagua Diez et al., Toward Self-Authenticable Wearable Devices, Feb. 2015, IEEE, vol. 22, Issue: 1, pp. 36-43. (Year: 2015).*
U.S. Appl. No. 15/569,218, filed Oct. 25, 2017.
U.S. Appl. No. 15/569,355, filed Oct. 25, 2017.
U.S. Appl. No. 15/568,934, filed Oct. 24, 2017.
U.S. Appl. No. 15/569,208, filed Oct. 25, 2017.
U.S. Appl. No. 15/569,105, filed Oct. 25, 2017.
International Preliminary Report on Patentability for International (PCT) Patent Application No. PCT/EP2016/059750, dated Nov. 16, 2017 8 pages.
Official Action for U.S. Appl. No. 15/569,105, dated Jun. 25, 2018 19 pages.
International Search Report for International Patent Application No. PCT/EP2016/059754, dated Jun. 8, 2016, 6 pages.
Written Opinion for International Patent Application No. PCT/EP2016/059754, dated Jun. 8, 2016, 6 pages.
Second Written Opinion for International Patent Application No. PCT/EP2016/059754, dated Mar. 21, 2017, 5 pages.
International Preliminary Report on Patentability for International Patent Application No. PCT/EP2016/059754, dated Jun. 19, 2017, 19 pages.
Official Action for U.S. Appl. No. 15/569,218, dated Nov. 16, 2018 14 pages.
Official Action for U.S. Appl. No. 15/569,105, dated Nov. 23, 2018 24 pages.
International Search Report and Written Opinion for International (PCT) Patent Application No. PCT/EP2016/059746, dated Jul. 22, 2016 11 pages.
Second Written Opinion for International (PCT) Patent Application No. PCT/EP2016/059746, dated Mar. 31, 2017 6 pages.
International Preliminary Report on Patentability for International (PCT) Patent Application No. PCT/EP2016/059746, dated Jul. 26, 2017 17 pages.
International Search Report and Written Opinion for International (PCT) Patent Application No. PCT/IB2016/000654, dated Aug. 8, 2016 13 pages.
Second Written Opinion for International (PCT) Patent Application No. PCT/IB2016/000654, dated Jun. 7, 2017 8 pages.
International Preliminary Report on Patentability for International (PCT) Patent Application No. PCT/IB2016/000654, dated Sep. 4, 2017 22 pages.
International Search Report and Written Opinion for International (PCT) Patent Application No. PCT/EP2016/059748, dated Jun. 24, 2016 13 pages.
Second Written Opinion for International (PCT) Patent Application No. PCT/EP2016/059748, dated Mar. 30, 2017 8 pages.
International Preliminary Report on Patentability for International (PCT) Patent Application No. PCT/EP2016/059748, dated Jun. 29, 2017 19 pages.
International Search Report and Written Opinion for International (PCT) Patent Application No. PCT/EP2016/059750, dated Aug. 2, 2016 12 pages.
International Search Report and Written Opinion for International (PCT) Patent Application No. PCT/IB2016/000653, dated Sep. 2, 2016 12 pages.
Second Written Opinion for International (PCT) Patent Application No. PCT/IB2016/000653, dated Apr. 28, 2017 6 pages.
International Preliminary Report on Patentability for International (PCT) Patent Application No. PCT/IB2016/000653, dated Jul, 27, 2017 7 pages.
International Search Report and Written Opinion for International (PCT) Patent Application No. PCT/EP2016/059753, dated Jun. 3, 2016 11 pages.
Second Written Opinion for International (PCT) Patent Application No. PCT/EP2016/059753, dated Mar. 31, 2017 6 pages.
International Preliminary Report on Patentability for International (PCT) Patent Application No. PCT/EP2016/059753, dated Jul. 3, 2017 18 pages.
International Search Report and Written Opinion for International (PCT) Patent Application No. PCT/EP2016/059752, dated Jul. 26, 2016 12 pages.
Second Written Opinion for International (PCT) Patent Application No. PCT/EP2016/059752, dated Mar. 29, 2017 6 pages.
International Preliminary Report on Patentability for International (PCT) Patent Application No. PCT/EP2016/059752, dated Jun. 28, 2017 17 pages.
Second Written Opinion for International (PCT) Patent Application No. PCT/EP2016/059754, dated Mar. 21, 2017 5 pages.
International Preliminary Report on Patentability for International (PCT) Patent Application No. PCT/EP2016/059754, dated Jun. 19, 2017 19 pages.
International Search Report and Written Opinion for International (PCT) Patent Application No. PCT/EP2016/059756, dated Jun. 27, 2016 11 pages.
Second Written Opinion for International (PCT) Patent Application No. PCT/EP2016/059756, dated Mar. 31, 2017 6 pages.
International Preliminary Report on Patentability for International (PCT) Patent Application No. PCT/EP2016/059756, dated Jul. 3, 2017 17 pages.
International Search Report and Written Opinion for International (PCT) Patent Application No. PCT/IB2016/000669, dated Aug. 1, 2016 12 pages.
Second Written Opinion for International (PCT) Patent Application No. PCT/IB2016/000669, dated Apr. 6, 2017 6 pages.
Official Action for U.S. Appl. No. 15/569,355, dated Aug. 20, 2019 25 pages.
Notice of Allowance for U.S. Appl. No. 15/568,934, dated Jul. 15, 2019 21 pages.
Official Action for U.S. Appl. No. 15/569,208, dated Sep. 12, 2019 12 pages.
Notice of Allowance for U.S. Appl. No. 15/569,105, dated Jul. 16, 2019 13 pages.
Notice of Allowance for U.S. Appl. No. 15/569,218, dated May 15, 2019 9 pages.
Advisory Action for U.S. Appl. No. 15/569,105, dated Mar. 11, 2019 5 pages.
Official Action with English Translation for China Patent Application No. 201680032259.1, dated Mar. 12, 2020, 22 pages.
Notice of Allowance for U.S. Appl. No. 15/569,208, dated Feb. 3, 2020 9 pages.
Official Action for U.S. Appl. No. 15/569,355, dated Aug. 5, 2020 25 pages.

* cited by examiner

WEARABLE DISCOVERY FOR AUTHENTICATION

CROSS REFERENCE TO RELATED APPLICATIONS

The present application is a national stage application under 35 U.S.C. of PCT Application No PCT/EP2016/059754, having an international filing date of May 2, 2016, which designated the U.S., which claimed the benefits of and priority, under 35 U.S.C. § 119(e), to U.S. Provisional Application Ser. No. 62/156,035, filed on May 1, 2015, entitled "Authentication Channel Flow through Wearable"; 62/156,030, filed on May 1, 2015, entitled "Using Multiple Mobile Devices to Determine Position, Location, or Inside/Outside Door"; 62/161,640, filed on May 14, 2015, entitled "Using Wearable to Determine Ingress or Egress"; 62/162,273, filed on May 15, 2015, entitled "Continuous Authentication"; 62/164,099, filed on May 20, 2015, entitled "Using a Secondary Mobile Device to Identify a Trusted Environment"; 62/167,172, filed on May 27, 2015, entitled "Method and Apparatus for Making a Decision on a Card"; 62/167,136, filed on May 27, 2015, entitled "Split Provisioning of Personal Wearable and Enterprise Phone"; 62/197,945, filed on Jul. 28, 2015, entitled "Wearable Discovery for Authentication"; 62/197,985, filed on Jul. 28, 2015, entitled "Wearable Misplacement"; and 62/198,240, filed on Jul. 29, 2015, entitled "Invisible Indication of Duress via Wearable." The entire disclosures of the applications listed above are hereby incorporated by reference, in their entirety, for all that they teach and for all purposes.

FIELD

The present disclosure is generally directed to access control systems and more specifically to devices that are configured to provide access information to access control systems.

BACKGROUND

In general, access control systems rely upon lock and key principles to grant or deny access to a secure asset. Whether the keys are configured as physical keys presented to a mechanical lock or virtual keys presented to an access control unit, most keys include specific features or characteristics that are either recognized by or match lock features before access is granted to the asset. Some access control systems employ the use of various portable devices to maintain credential information for presentation to a reading device. The portable devices are generally configured to communicate with the reading device via wireless communication protocols.

One example of a portable device includes the radio frequency identification (RFID) device, such as a contactless smart card, key fob, or the like, to store credential information that can be used to gain access to an asset. When presented to a reader/interrogator, the smart card transmits the stored credential information for verification by the reader/interrogator. The reader/interrogator processes the credential information and determines if the smart card being presented is a valid smart card. If the reader/interrogator determines that credential information associated with the smart card is valid, then the reader/interrogator initiates any number of actions including allowing the holder of the smart card access to an asset protected thereby.

Another example of a portable device can include a wireless mobile device, such as a communication device, mobile phone, smartphone, etc. In this case, credential information may be stored in a memory associated with the mobile device and communicated to a reading device using at least one wireless communication protocol available to the mobile phone.

As access control technology continually progresses, devices and communication protocols evolve to offer more security, portability, and interoperability. However, the benefits of this evolution may be thwarted by increasing instances of identity theft, stolen credentials, and/or other access control device theft.

WO 2009/127984 discloses methods and apparatus are provided for authenticating communications between a user computer and a server via a data communications network. A security device of the apparatus has memory containing security data, and security logic adapted to use the security data to generate an authentication response to an authentication message received from the server in use. An interface device of the apparatus is adapted for data communications with the security device. The interface device has a receiver for receiving from the user computer an authentication output containing the authentication message sent by the server to the user computer in use, and interface logic adapted to extract the authentication message from the authentication output and to send the authentication message to the security device. The apparatus includes a communications interface for connecting to the server via a communications channel bypassing the user computer. One of the security device and interface device is adapted for sending the authentication response to the server (3) via the communications channel bypassing the user computer.

SUMMARY

It is with respect to the above issues and other problems that the embodiments presented herein were contemplated.

Access control systems are well-suited for gathering useful information. For example, an access control system may be configured to count the number of times it grants access to the protected resource in a given period of time (hour, day, week, etc.), which information can then be used to identify needed access point maintenance intervals, or to schedule or allocate access-point resources (e.g. security guards, receptionists, and so forth). While some access control systems may be capable only of tracking generic information, others may be capable of tracking user-specific information, such as the time(s) at which each user presents credentials to the access control system reader. Such information can be used, for example, to verify an individual's claimed hours worked.

The proliferation of wearable mobile devices presents an opportunity to enhance access control system functionality. Such wearable mobile devices may be used in place of or in conjunction with more traditional mobile devices to gather and send information to an access control system, thus increasing the ability of the access control system to gather useful information.

Inherent in the use of smartcards, key fobs, mobile devices, or other loose objects as credential devices (e.g. to carry credential information) is the possibility that the owner of the credential device may be separated from the credential device itself—whether deliberately (e.g. by theft) or accidentally (e.g. by misplacing or losing the credential device). If someone other than the owner of the credential device obtains possession thereof, then the security of the access control system associated with the credential device may be compromised. While some access control systems have mechanisms in place to deal with lost or stolen credential devices, such as blacklisting the credential device or revoking the credential device's digital keys, such mechanisms generally take time to implement and often require that the owner of the credential device both recognize that the credential device has been lost or stolen and report that information to the access control system operator. Until these actions are taken, an illicit possessor of the credential device may use the credential device to gain access to the resource protected by the access control system, thus rendering the access control system ineffective.

The trend toward increased use of multiple mobile devices may be exploited to enhance access control system security and reduce the likelihood that anyone other than a credential device's owner may use the credential device to gain access to a resource protected by an access control system. In particular, an access control system may be configured to allow access to the holder of a credential device only when the credential device is within communication range of a second device, such as a wearable mobile device. In this manner, even if the credential device is lost or stolen, it cannot be used to gain access without the second device. Because it is less likely that an illicit user will obtain both the credential device and the second device than it is that an illicit user will obtain the credential device alone, access control systems implementing the present disclosure may provide greater security than those that do not.

As used herein, an access control system is a system comprising a reader configured to control access to a protected resource at a given access point, such as a door or gate, and further comprising one or more credential devices (e.g., an RFID tag, a mobile device, etc.) configured to communicate with the reader. A mobile device may be a smartphone, a tablet, or any other device comprising a processor, a data storage capability (e.g., computer memory), and a wireless communication capability. The terms identification code, electronic key, and mobile key are used interchangeably herein. A user is an individual in possession of a mobile device that has an authorized identification code and that is configured to wirelessly communicate with the reader of an access control system. A reader or reading device or interrogator is a device having a location (which may or may not be fixed) near an access point to a protected resource, and that is configured to grant access to the protected resource, for example, upon receipt of authorized credentials from a mobile device. A reader may comprise a contact-based or contactless communication interface (also referred to herein as a wireless communication interface, which may include one or both of a wireless communication receiver and a wireless communication transmitter, or a wireless communication transceiver), a memory for storing at least instructions, and a processor for carrying out instructions stored in memory. Alternatively or additionally, the instructions may be stored as firmware.

A wearable mobile device, also referred to simply as a wearable device, can include any physical electronic device having a processor, a memory, and a communications module that is configured to be worn by, or otherwise attached to, a user. A wearable mobile device is a type of mobile device, as the term mobile device is used herein. In some cases, the wearable device may be worn as an implant introduced intradermally (e.g., within the skin, etc.) and/or subdermally (e.g., under the skin, etc.) in a user. Additionally or alternatively, a wearable device may be adhered or otherwise placed into contact with the dermis of a user (e.g., supradermally or outside of the skin of a user, etc.). In some embodiments, a wearable device may be worn as an article of clothing or other accessory. Examples of wearable devices can include, but are in no way limited to, activity monitors, heart rate monitors, watches, rings, belts, bracelets, jewelry, clothing, buttons, necklaces, shoes, hats, pins, accessories, scarves, combinations and/or parts thereof, and/or any other wearable item.

By way of example, visitors to a secure facility, or location, may be issued a wearable device for authentication while visiting. For example, the wearable device may be attached to a user's clothing, body, or other item that is in proximity to the user. This attachment may include clasping, pinning, connecting, or otherwise fastening the wearable device to be worn by the user.

Any number of communications protocols may be employed by the wearable device and/or the mobile device. Examples of communications protocols can include, but are in no way limited to, the protocol or protocols associated with near field communication (NFC), radio frequency identification (RFID) (e.g., operating at 125 kHz, 13.56 kHz, etc.), Bluetooth® wireless communication, Bluetooth® Low Energy (BLE), Personal Area Network (PAN), Body Area Network (BAN), cellular communications, WiFi communications, and/or other wireless communications.

For instance, a user carrying a mobile device and wearing a wearable device while walking may impart a similar repetitive motion, force, or movement upon both the wearable device and the mobile device. Continuing this example, a user walking may provide a substantially similar force while stepping that is imparted to the wearable device and the mobile device. This force may occur with every step taken by the user (e.g., where a peak force occurs with every step that is taken at some point in time measured over a period of time, etc.). In other words, both the mobile device and the wearable device may experience a similar periodicity of maximum and minimum forces exerted on their respective sensors (e.g., gyroscopic sensors, accelerometers, etc.). Additionally or alternatively, when a wearable device is separated from the mobile device, or vice versa, the motion results from the comparison may be determined to be different. For example, a user may leave a mobile device on a desk while walking with the wearable device in an access controlled environment.

Similarly, other information from one or more components of the wearable device and mobile device may be gathered and used by an access control system. This information may include, but is in no way limited to, temperature data, barometric pressure data, biometric data (e.g., heart rate, breathing rate, etc.), altimeter and/or altitude data, audible data (e.g., detecting similar sounds in an area around each device and comparing the detected sounds and/or sound profiles to one another determine whether continuous authentication is allowed, where matching audible data allows authentication and where nonmatching audible data disables authentication, etc.), light data (e.g., detecting similar light radiation in an area around each device and comparing the light detected at each device to determine whether continuous authentication is allowed, etc.), magnetic radiation data, other energy data, combinations thereof, and/or the like.

As provided herein, the wearable device may be configured to operate in conjunction with one or more mobile devices. In some embodiments, the mobile devices may be provided by a manufacturer different from the wearable device and the two devices may utilize the same or different operating systems.

The wearable device may include its own power source or use power provided from another source. In some embodiments, the wearable device may include electronics that can be powered by a mobile device and/or a reading device. One example of such electronics may be a wearable device having RFID components, (e.g., a capacitor, antenna, etc.). In this example, when the wearable device is presented within an RFID field provided by the mobile device and/or the reading device, the mobile device and/or the reading device provides energy via the RFID field that can be stored in the capacitor of the wearable device.

The terms "memory," "computer memory," "computer-readable medium," and "computer-readable storage medium," as used herein, refer to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, "credentials" or "credential information" refer to any data, set of data, encryption scheme, key, and/or transmission protocol carried by a particular device (e.g., a "credential device," a "mobile device," or a "wearable device") to authenticate and/or to verify its authenticity or access authorization with a reader, mobile device, and/or interrogator.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Copyright and Legal Notices

Figure 1:
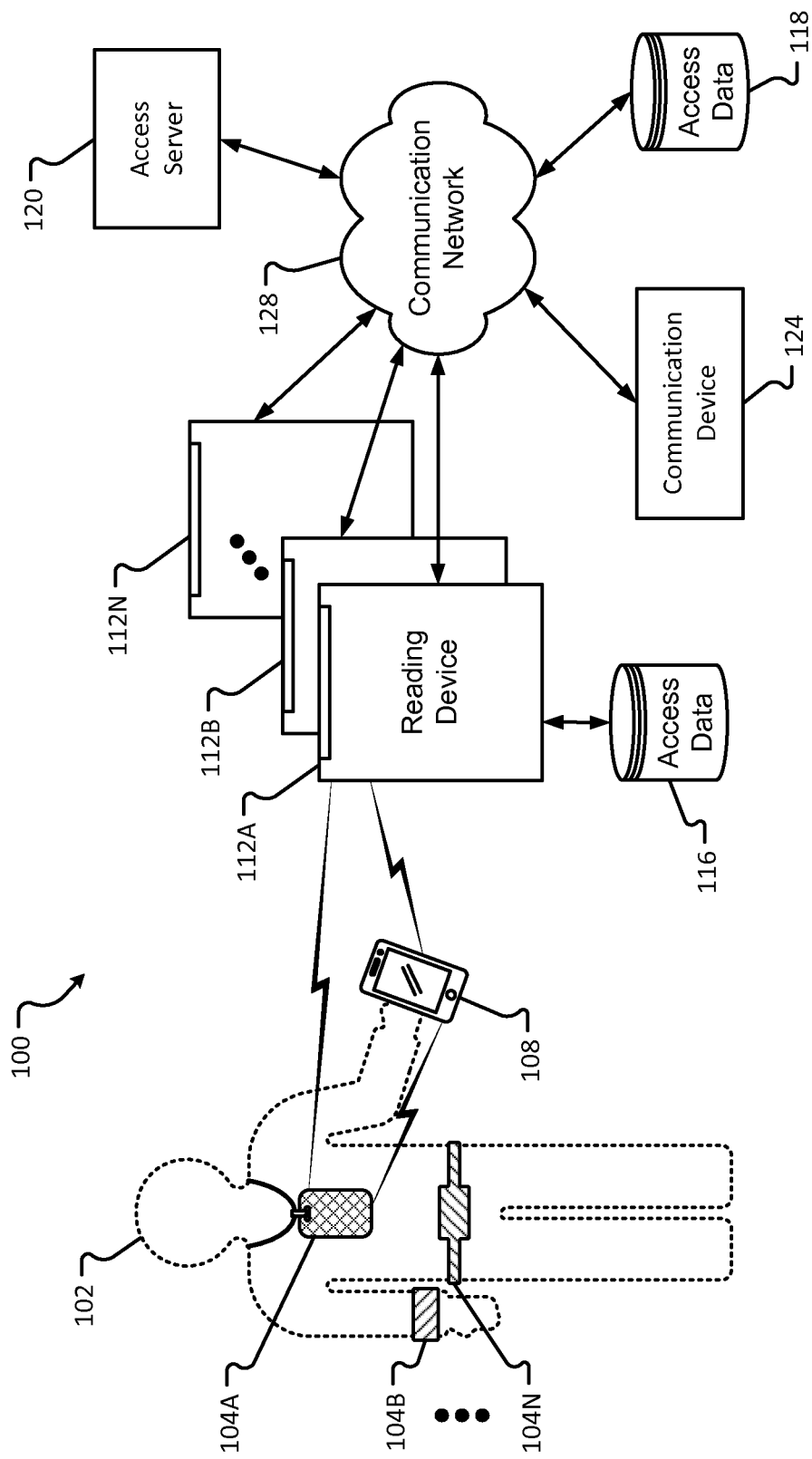
FIG. 1 is a diagram depicting an access control system in accordance with embodiments of the present disclosure.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

According to embodiments of the present disclosure, a credential device for an access control system includes a communication interface enabling the credential device to communicate with an access control reader; a communication interface enabling the credential device to communicate with a second device; a memory containing a mobile key and instructions configured to allow the mobile key to be transmitted to the reader only after a predetermined requirement relating to the second device is satisfied; and a processor configured to execute the instructions stored in memory.

In some embodiments, the predetermined requirement relating to the second device referenced above may be one or more of: the credential device must successfully communicate with the second device; the credential device must successfully authenticate with the second device; the credential device must receive predetermined information from the second device; the credential device must be presently paired or bonded with the second device; an identification number received from the second device must match an identification number stored in the memory of the credential device; biometric information received from the second device must match biometric information obtained from a biometric sensor in the credential device; and biometric information received from the second device must match biometric information stored in the memory of the credential device.

Also in some embodiments, the instructions in the memory are further configured to cause the credential device to transmit the mobile key to the reader only if the predetermined requirement relating to the second device is satisfied within a predetermined period of time after the credential device initiates communications with the access control reader.

Additionally, in some embodiments the second device is a wearable mobile device. The communication interface enabling the credential device to communicate with the second device may use a Bluetooth communication protocol. The credential device and the second device may each comprise operating systems that enable telecommunication functions or features. In embodiments, the credential device is capable of pairing with the second device. Also, the mobile key may be stored in a digital key vault within the memory.

According to other embodiments of the present disclosure, a system includes a memory for storing a mobile key and an access control module, the access control module comprising instructions configured to make an access decision based on at least information from or about an access control reader, information from or about a second device, and a mobile key; a communication interface for communicating with the access control reader; a communication interface for communicating with the second device; and a processor for executing the instructions in the access control module.

The information from or about the reader, referenced above, may be at least one of: a serial number, another identification number, a timestamp, a list of authorized credential devices, information corresponding to a public key, information corresponding to a public certificate, and a schedule correlating mobile keys with authorized access times. The information from or about the second device, also referenced above, may be at least one of: an indication of whether the credential device has successfully authenticated with the second device, the time of the most recent communication between the credential device and the second device, whether the credential device is presently paired or bonded to the second device, whether the credential device was recently paired or bonded to the second device, information identifying the second device, location information, biometric information, information corresponding to a public key, information corresponding to a public certificate, and a timestamp.

Also, the instructions of the access control module may be further configured to compare the information from or about the second device with information stored in the memory of the credential device. Additionally or alternatively, the instructions of the access control module may be further configured to make an access granted decision only if the information from or about the second device indicates that the second device is within a predetermined proximity to the credential device. Also additionally or alternatively, the instructions of the access control module may be further configured to cause the credential device to transmit the access decision to the access control reader via the communication interface for communicating with the access control reader.

According to still other embodiments of the present disclosure, a method comprises using a first wireless communication interface to enable communications between a credential device and a reader; using a second wireless communication interface to enable communications between the credential device and a wearable device; and conditioning transmission of a mobile key from the credential device to the reader via the first wireless communication interface upon the wearable device satisfying a predetermined requirement via the second wireless communication interface.

The second wireless communication interface may comprise at least one of a near field communication interface or a Bluetooth interface. The wearable device may transmit information to the credential device via the second wireless communication interface, and the credential device may transmit the information received from the wearable device to the reader via the first wireless communication interface. The reader may further comprise memory that further stores instructions for causing the reader to generate one or more wearable device discovery signals and to transmit the one or more wearable device discovery signals to the wearable device via the credential device. The method may further comprise using a third wireless communication interface to enable communications between the wearable device and the reader. The wearable device may send a wearable device discovery signal received from the third wireless communication interface to the credential device, which may in turn transmit the wearable device discovery signal to the reader. The predetermined requirement may comprise determining that the wearable device and the credential device are paired to one another and are capable of communicating information to one another via the second wireless communication interface.

The information from or about the second device, referenced above, may be at least one of: an indication of whether the credential device has successfully authenticated with the second device, the time of the most recent communication between the credential device and the second device, whether the credential device is presently paired or bonded to the second device, whether the credential device was recently paired or bonded to the second device, information identifying the second device, location information, biometric information, information corresponding to a public key, information corresponding to a public certificate, and a timestamp.

Additionally, in some embodiments, the instructions stored in the memory may be configured to control access to the mobile key by controlling the operation of a physical switch. The physical switch, in a default state, may prevent access to the memory in which the mobile key is stored. In other embodiments, the instructions may be configured to control access to the mobile key by controlling a digital key vault in which the mobile key is stored. And, the digital key vault, in a default state, may prevent access to the mobile key.

According to yet other embodiments of the present disclosure, an access control system includes a credential device comprising a first wireless communication interface, a first processor, and a credential device memory; a second device comprising a second wireless communication interface, a second processor, and a second device memory; and a reader comprising a third wireless communication interface, a lock mechanism interface, a reader memory, and a third processor. The credential device memory stores a credential and instructions for causing the first processor to send the credential to the reader via the first wireless communication interface, and the reader memory stores instructions for causing the third processor to evaluate the credential received from the credential device via the third wireless communication interface only after determining that second device information received from the second device corresponds to registration information stored in the reader memory.

The reader may receive the second device information directly from the second device via a near field communication link or a Bluetooth link. Alternatively, the second device may transmit the second device information to the credential device, and the credential device may transmit the information to the reader. The reader memory may further store instructions for causing the third processor to generate one or more second device discovery signals and to transmit the one or more second device discovery signals via the third wireless communication interface.

Also, the second device memory may store instructions for causing the second processor to generate a responsive signal upon receipt of a second device discovery signal and to transmit the responsive signal via the second wireless communication interface. The responsive signal may comprise the second device information.

Before any embodiments of the disclosure are explained in greater detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

One advantage of mobile devices as credential devices, as opposed to, for example, RFID tags, is that mobile devices are generally capable of beyond-near-field communications using communication protocols such as Bluetooth, BLE, WiFi, ZigBee, infrared, sound, light, etc. In access control systems comprising a reader configured to communicate with a mobile device using one or more such communication protocols, the mobile device can communicate information to the reader even when it is not in close proximity to (e.g., when it is more than 1.0 m away from) the reader. Additionally, storing credentials on mobile devices, which users typically carry (or wear) for other purposes, allows users to carry fewer objects. And mobile devices are typically equipped with various sensors not included in traditional RFID tags. Still further, mobile devices typically have greater processing power than traditional RFID tags. As described herein, these and other advantages may be exploited to enhance security of an access control system.

As will be discussed in greater detail herein, a credential device according to embodiments of the present disclosure may comprise one or more transceivers for wirelessly communicating with a reader and with a second device. The credential device may be, for example, a mobile device, including a wearable device. The second device may be any device capable of communicating with the credential device, including a wearable mobile device or a non-wearable mobile device. According to embodiments of the present disclosure, the credential device is configured to provide its mobile key or other credentials to an access control system reader only after successful discovery of the second device.

FIG. 1 is a diagram depicting an access control system 100 for authenticating a user 102 using one or more wearable devices 104 and a mobile device 108, in which embodiments of the present disclosure may be implemented. In one embodiment, the access control system 100 comprises at least one reading device 112, at least one wearable device 104, and at least one portable/mobile device 108. The reading device 112 may include an access data memory 116. The access data memory 116 may be configured to store access information, identification data, rules, program instructions, and/or other data associated with performing access operations of an access control system 100. For example, the access data memory 116 may store a rule requiring discovery of a second device, such as a wearable device 104, for purposes of authenticating a credential device (e.g. a device having credentials stored in a memory thereof, such as a mobile device 108), during an access attempt by a user 102 possessing the credential device. Alternatively, the access data memory 116 may store a rule requiring confirmation from one of the wearable device 104 and the portable device 108 that both devices are within communication range of each other. In some embodiments, the reading device 112 may be configured to communicate with an access data memory 116 across a communication network 128. The access data memory 116 may be located remotely, locally, and/or locally and remotely, from the reading device 112.

The wearable device 104 and/or the mobile device 108 may be configured to communicate with a reading device 112 across one or more wireless communication connections. These one or more wireless communication connections can include communications via at least one of conventional radio protocols, proximity-based wireless communication protocols, Bluetooth™, BLE, infrared, audible, NFC, RF, and other wireless communication networks and/or protocols. In some cases, communications between the wearable device 104 and the reading device 112 may be established automatically when the wearable device 104 enters an active zone of an interrogating reading device 112. In one embodiment, the active zone of the reading device 112 may be defined as a three-dimensional space where the intensity of RF signals emitted by the reading device 112 exceeds a threshold of sensitivity of the wearable device 104 and the intensity of RF signals emitted by the wearable device 108 exceeds a threshold of sensitivity of the reading device 112.

In some embodiments, the wearable device 104 and/or the mobile device 108 may be configured to communicate with a reading device 112 across a communication network 128. The communication network 128 can include communication via at least one of conventional radio networks, wireless communication networks, Zig-Bee, GSM, CDMA, WiFi, and/or using other communication networks and/or protocols as provided herein.

In one embodiment, authentication may be required between the wearable device 104 and/or the mobile device 108 and the reading device 112 before further communications are enabled. Additionally or alternatively, communication or even authentication may be required between the wearable device 104 and the mobile device 108 before further communications between the wearable device 104 and the reading device 112, and/or between the mobile device 108 and the reading device 112, are enabled. In any event, the further communications may provide communications in which access control information (e.g., keys, codes, credentials, etc.) are shared. In some embodiments, the authentication may be provided via one-way or mutual authentication. Examples of authentication may include, but are not limited to, simple authentication based on site codes, trusted data formats, shared secrets, and/or the like. As can be appreciated, access control information is more sensitive and may require more involved validation via, for example, an encrypted exchange of access control information.

In some embodiments, the reading device 112 may be configured to request access control information from the wearable device 104 and/or the mobile device 108. This access control information may be used to validate the wearable device 104 and/or the mobile device 108 to the reading device 112. Validation may include referring to information stored in access data memory 118 or some other memory associated with the wearable device 104 and/or the mobile device 108. Typically, a reading device 112 is associated with a particular physical or logical asset (e.g., a door protecting access to a secure room, a computer lock protecting sensitive information or computer files, a lock on a safe, and the like). In one embodiment, the wearable device 104 and/or the mobile device 108 may be validated via one or more components of the access control system 100. Once the wearable device 104 and/or the mobile device 108 is authenticated, credential information associated with the wearable device 104 and/or the mobile device 108 may be validated. During this process, the reading device 112 may generate signals facilitating execution of the results of interrogating the wearable device 104 and/or the mobile device 108 (e.g., signals that engage/disengage a locking mechanism, allow/disallow movement of a monitored article, temporarily disable the reading device 112, activate an alarm system, provide access to a computer system, provide access to a particular document, and the like). Alternatively, the access server 120 or some other system backend component may generate such signals.

In accordance with embodiments of the present disclosure, the reading device 112 may collect information about the wearable device 104 from the mobile device 108, or vice versa, before an access control decision can be made. For example, the reading device 112 may require not only credential information stored on the wearable device 104 to validate the wearable device 104, but also information indicating that the mobile device 108 is presently (or has recently been) within communication range of the wearable device 104. In other embodiments, the mobile device 108 may communicate with the reading device 112, and may be required to provide both credentials and information indicating that the wearable device 104 is presently (or has recently been) within communication range of the mobile device 108 before an access control decision may be made. In some embodiments, the reading device 112 may communicate separately with the mobile device 108 and the wearable device 104, and the required confirmation may be or include either or both of a transmission from the mobile device 108 containing information that the reading device 112 transmitted only to the wearable device 104 (e.g. to confirm that the wearable device 104 transmitted the information to the mobile device 108), and a transmission from the wearable device 104 containing information that the reading device 112 transmitted only to the mobile device 108 (e.g. to confirm that the mobile device 108 transmitted the information to the wearable device 104). Thus, the validity of the wearable device 104 depends on whether the wearable device 104 is within communication range of the mobile device 108, and the validity of the mobile device 108 depends on whether the mobile device 108 is within communication range of the wearable device 104.

In one embodiment, upon validating credential information stored on the wearable device 104, and upon confirming that the wearable device 104 is within communication range of the mobile device 108, the reading device 112 generates signals facilitating execution of the results of interrogating the wearable device 104 (or the mobile device 108) (e.g., engages/disengages a locking mechanism, allows/disallows movement of a monitored article, temporarily disables itself, activates an alarm system, provides access to a computer system, provides access to a particular document, and the like). Alternatively, the reading device 112 may generate such signals upon validating credential information stored on the mobile device 108, and upon confirming that the mobile device 108 is within communication range of the wearable device 104. As provided above, the access server 120 may generate such signals.

The access server 120 may include a processor, a memory, and one or more inputs/outputs. The memory of the access server 120 may be used in connection with the execution of application programming or instructions by the processor, and for the temporary or long term storage of program instructions and/or data. As examples, the memory may comprise RAM, DRAM, SDRAM, or other solid state memory. Additionally or alternatively, the access server 120 may communicate with an access data memory 118. Like the memory of the access server 120, the access data memory 118 may comprise a solid state memory or device. The access data memory 118 may comprise a hard disk drive or other random access memory.

In some embodiments, the reading device 112 may be configured to communicate with one or more devices across a communication network 128. For example, the reading device 112 may communicate with a wearable device 104 and/or a mobile device 108 across the communication network 128. Among other things, this communication can allow for back-end authentication and/or provide notifications from the reading device 112 to the mobile device 108 or the wearable device 104. The communication network 128 may comprise any type of known communication medium or collection of communication media and may use any type of protocols to transport messages between endpoints. The communication network 128 may include wired and/or wireless communication technologies. The Internet is an example of the communication network 128 that constitutes an Internet Protocol (IP) network consisting of many computers, computing networks, and other communication devices located all over the world, which are connected through many telephone systems and other means. Other examples of the communication network 128 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, similar networks used in access control systems between readers and control panels, and any other type of packet-switched or circuit-switched network known in the art. In addition, it can be appreciated that the communication network 128 need not be limited to any one network type, and instead may be comprised of a number of different networks and/or network types. Moreover, the communication network 128 may comprise a number of different communication media such as coaxial cable, copper cable/wire, fiber-optic cable, antennas for transmitting/receiving wireless messages, and combinations thereof.

In some embodiments, the access control system 100 may include at least one communication device 124. A communication device 124 may include, but is not limited to, a mobile phone, smartphone, smart watch, soft phone, telephone, intercom device, computer, tablet, mobile computer, alarm, bell, notification device, pager, and/or other device configured to convert received electrical and/or communication signals. In one embodiment, the communication device 124 may be used to receive communications sent from the wearable device 104 or the mobile device 108 via the reading device 112 or intended for the reading device 112.

Figure 2:
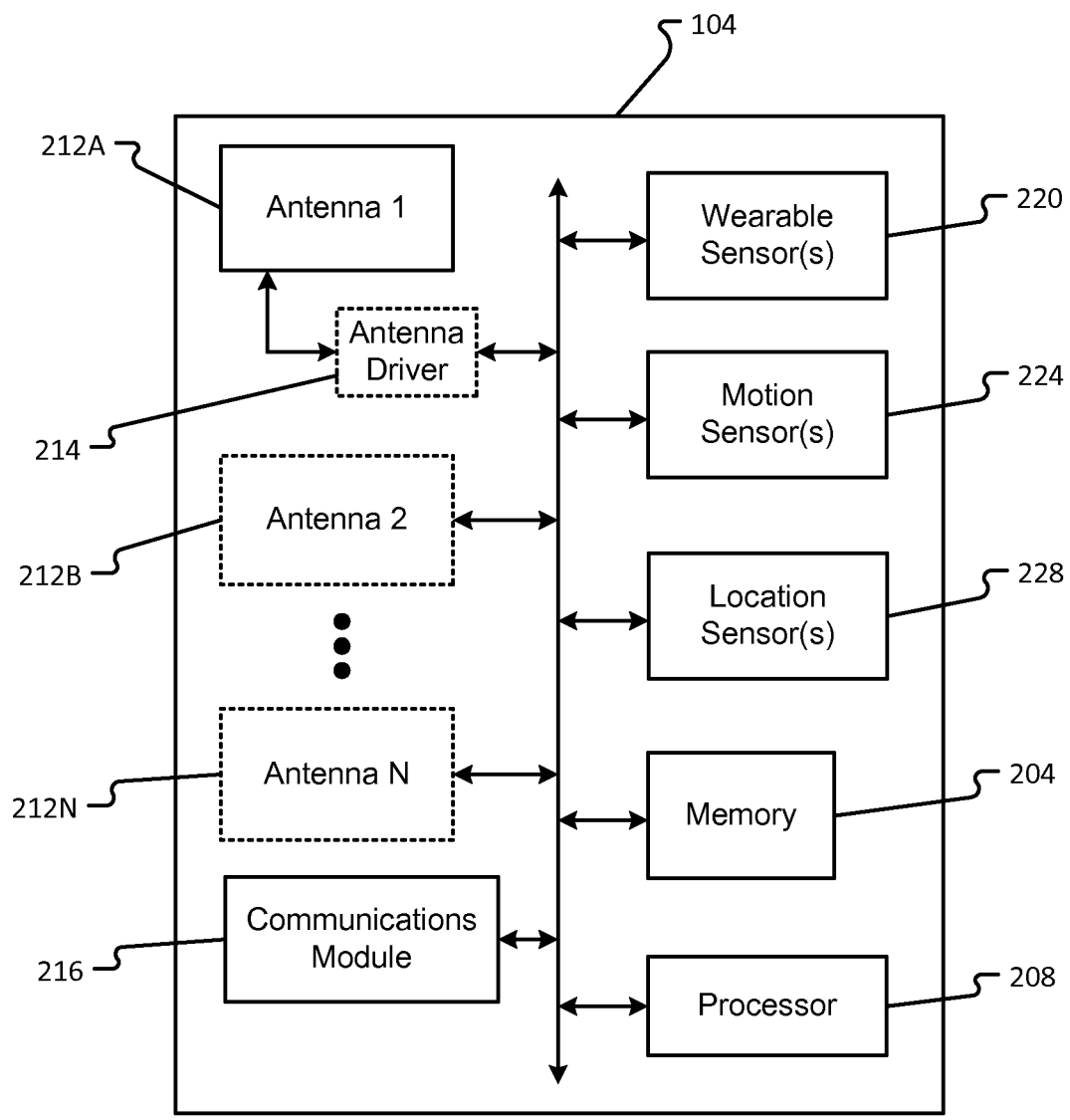
FIG. 2 is a block diagram depicting a wearable device or components thereof in accordance with embodiments of the present disclosure.

Referring now to FIG. 2, a block diagram depicting a wearable device 104 is shown in accordance with embodiments of the present disclosure. The wearable device 104 may include one or more components, such as, a memory 204, a processor 208, an antenna 212A-N, a communications module 216, a wearable sensor 220, a motion sensor 224, and a location sensor 228. In some embodiments, the wearable device 104 may further include a power module. The processor 208 may be an application specific integrated circuit (ASIC), microprocessor, programmable controller, or the like.

The memory 204 of the wearable device 104 may be used in connection with the execution of application programming or instructions by the processor 208, and for the temporary or long term storage of program instructions and/or data. The memory 204 may contain executable functions that are used by the processor 208 to run other components of the wearable device 104. In one embodiment, the memory 204 may be configured to store credential information and/or access control information. For instance, the credential information/access control information may include, but is not limited to, unique identifications, manufacturer identification, passwords, keys, encryption schemes, transmission protocols, and the like. As examples, the memory 204 may comprise RAM, DRAM, SDRAM, or other solid state memory. The memory 204 may also store identification information of the wearable device 104, including a serial number, a device name provided by a manufacturer or user of the device, information about the wearable device 104 type, specification information about the wearable device 104, and so forth. Such information may be communicated to other devices via, for example, the communications module 216, which is described in further detail below.

The one or more antennas 212A-N may be configured to enable wireless communications between the wearable device 104 and a reading device 112 and/or mobile device 108. As can be appreciated, the antenna(s) 212A-N may be arranged to operate using one or more wireless communication protocols and operating frequencies including, but not limited to, Bluetooth®, NFC, Zig-Bee, GSM, CDMA, WiFi, RF, and the like. By way of example, the antenna(s) 212A-N may be RF antenna(s), and as such, may transmit RF signals through free-space to be received by a reading device 112 having an RF transceiver.

In some embodiments, the wearable device 104 may include a power module. The power module may be configured to provide power to the parts of the wearable device 104 in order to operate. The power module may store power in a capacitor of the power module. In one embodiment, electronics in the power module may store energy in the capacitor and turn off when an RF field is present. This arrangement can ensure that energy is presented to the wearable device 104 minimizing any effect on read distance. Although the wearable device 104 may be configured to receive power passively from an electrical field of a reading device 112, it should be appreciated that the wearable device 104 may provide its own power. For example, the power module may include a battery or other power source to supply power to parts of the wearable device 104.

The wearable device 104 may include a communications module 216 that is configured to communicate with one or more different systems or devices either remotely or locally to the wearable device 104. Thus, the communications module 216 can send or receive messages from other wearable devices 104, from mobile devices 108, from reading devices 112, from communication devices 124, from access servers 120, from access control systems, or from other systems. In some embodiments, the communicated information may be provided to, or exchanged with, other components within the wearable device 104. For example, information communicated from the wearable device 104 may be information stored in the memory 204 of the wearable device 104.

Embodiments of the wearable device 104 may include at least one wearable sensor 220. Among other things, the wearable sensor 220 may be configured to detect an attachment and/or detachment of the wearable device 104 to a user 102. For instance, a wearable device 104 may include a clasp that is required to be opened in attaching and/or removing the wearable device 104 from a user 102 (e.g., similar to a clasp of a watch band, bracelet, earring, necklace, etc.). The actuation of the clasp may be detected by a wearable sensor 220 of the wearable device 104. Examples of other wearable sensors 220 may include, but are in no way limited to, contact sensors, switches, proximity sensors, etc., and/or combinations thereof.

In some embodiments, the wearable device 104 may employ one or more sensors 220, 224, 228 that are configured to detect information corresponding to a state of the wearable device 104. The wearable sensors 220 may include, but are not limited to, one or more biometric sensors (e.g., heart rate, body temperature and/or heat signature, blood pressure, etc.), capacitive sensors, light sensors, temperature sensors, pressure sensors, contact sensors, combinations thereof, and the like. It is an aspect of the present disclosure that the processor 208 of the wearable device 104 may receive the sensor information and determine whether the wearable device 104 is being worn by a user 102, whether the wearable device 104 has been removed from a user 102, whether any interruption to the wearing of the wearable device 104 is detected (e.g., whether the wearable device 104 has been continuously worn by, and/or removed from, a user 102, timing associated therewith, etc.). By way of example, the biometric sensor of the wearable sensors 220 may detect biometric characteristics associated with a user 102 wearing the wearable device 104 (e.g., a heart rate, a blood pressure, a body temperature, skin contact data, etc.). The biometric characteristics may be used to determine a state of the wearable device 104 (e.g., being worn or not, etc.) and/or determine an identity of a user 102 wearing the wearable device 104 (e.g., via comparing collected biometric characteristics to baseline characteristics stored in a memory and associated with the user 102, etc.).

The motion sensors 224 may include one or more of a gyroscope, accelerometer, transducer, and/or other mechanical detection component that are each configured to detect a force and/or motion associated with the wearable device 104. This detected motion of the wearable device 104 may be compared, via the processor 208 of the wearable device 104, to known motion profiles stored in the memory 204 or other associated memory in determining a state of the wearable device 104. For instance, a particular motion of the wearable device 104 may indicate that the wearable device 104 is being worn by a user 102. In one embodiment, the detected motion of a wearable device 104 may be compared to the detected motion of an associated mobile device 108, or vice versa, to generate comparison results. The comparison results may indicate similarities between the motion of the wearable device 104 and a motion of the mobile device 108 over time. Similar motion comparison results between the wearable device 104 and the mobile device 108 may be used to verify the authenticity of one of the wearable device 104 and the mobile device 108 by serving as confirmation that the other of the wearable device 104 and the mobile device 108 is within the possession of the same user 102. Dissimilar motion comparison results between the wearable device 104 and the mobile device 108 may be used as evidence that two devices (e.g. a mobile device 108 having credentials stored therein, and a wearable device 104) are not in the possession of the same user 102.

The wearable device 104 may include one or more location sensors 228. The location sensors may be configured to determine a geographical location and/or position of the wearable device 104. In one embodiment, this location may be based on Global Positioning System (GPS) data provided by a GPS module of the wearable device 104. In some embodiments, the location of the wearable device 104 may be provided based on cell tower data, WiFi information, iBeacon information, and/or some other location information provided by a location module and/or a communications module 216 of the wearable device 104. The location of a mobile device 108 may be determined in a similar, if not identical, manner as determining the location of the wearable device 104. Although location information may not always be available inside buildings or other structures, location information provided by the one or more location sensors 228 may be used, where available, to make an ingress or egress determination for the wearable device 104 and/or the mobile device 108.

Figure 3:
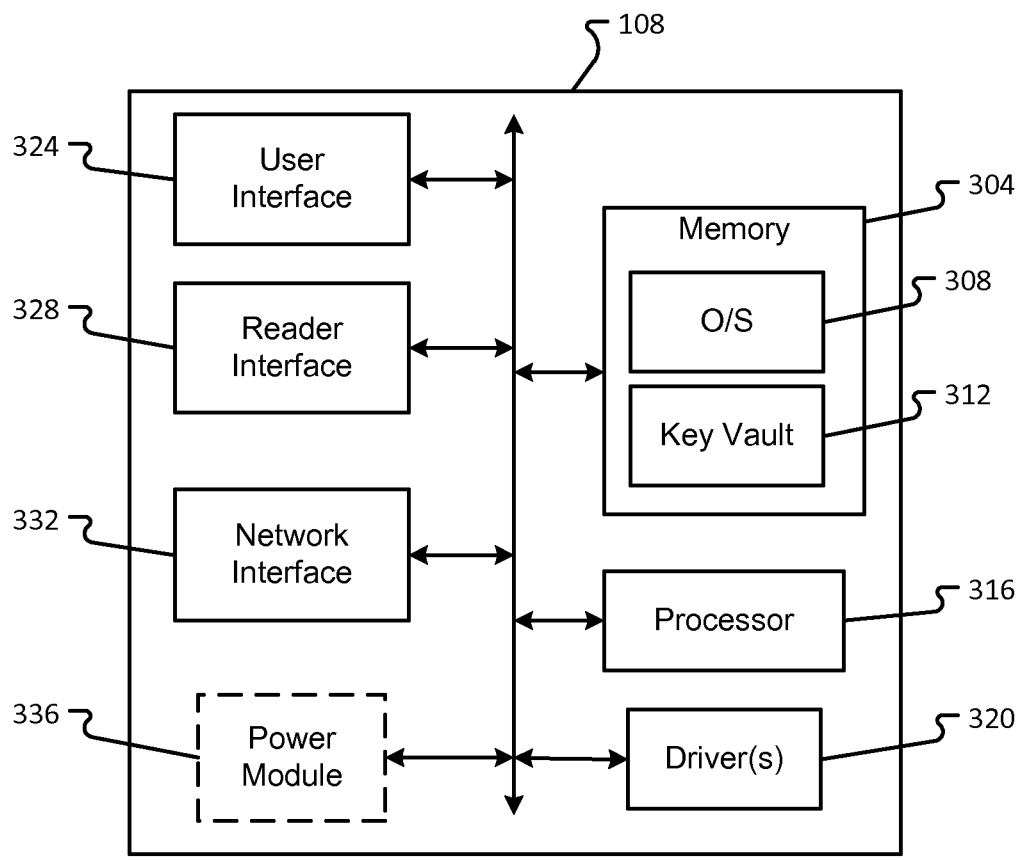
FIG. 3 is a block diagram depicting a mobile device or components thereof in accordance with embodiments of the present disclosure.

FIG. 3 shows a block diagram depicting a mobile device 108 in accordance with embodiments of the present disclosure. The mobile device 108 may correspond to any type of electronic device and, as the name suggests, the electronic device may be portable in nature. As some examples, the mobile device 108 may correspond to a cellular phone or smartphone carried by a user. Other examples of a mobile device 108 include, without limitation, wearable devices (e.g., glasses, watches, shoes, clothes, jewelry, wristbands, stickers, etc.). The mobile device 108, as shown in FIGS. 1 and 3, may be provided with a key vault 312 that stores one or a plurality of keys. The key(s) may be communicated to a reader 112 in connection with a holder of the mobile device 108 attempting to gain access to an asset protected by the reader 112. As an example, the mobile device 108 may be presented to the reader 112 by a user 102 or holder of the mobile device 108.

If NFC is being used for the communication channel, then the reader 112 and mobile device 108 may have their interfaces/antennas inductively coupled to one another at which point the reader and/or mobile device 108 will authenticate or mutually authenticate with one another. As described elsewhere herein, authentication may require discovery of a second, known device, such as a wearable device 104. Following authentication, the reader 112 may request a key or multiple keys from the mobile device 108, or the mobile device 108 may offer a key or multiple keys to the reader 112. Upon receiving the key(s) from the mobile device 108, the reader 112 may analyze the key(s) and determine if the key(s) are valid and, if so, allow the holder/user of the mobile device 108 access to the asset protected by the reader 112. It should be appreciated that the mobile device 108 may alternatively or additionally be configured to analyze information received from the reader 112 in connection with making an access control decision and/or in connection with making a decision whether or not to provide key(s) to the reader 112. Examples of technologies that can be used by the mobile device 108 to make an access control decision for itself are further described in U.S. Pat. No. 8,074,271 to Davis et al. and U.S. Pat. No. 7,706,778 to Lowe, both of which are hereby incorporated herein by reference in their entirety.

If BLE or some other non-inductive protocol (e.g., Wi-Fi) is being used for the communication channel, then the reader 112 and mobile device 108 may perform a discovery routine prior to pairing with one another or otherwise connecting to establish the communication channel. After the channel is established, however, the reader 112 and mobile device 108 may then authenticate one another and exchange relevant information, such as the key(s), to enable an access control decision to be made. Here again, the authentication process may include discovery of a second known device, as described elsewhere herein. If a positive access control decision is made (e.g., it is determined that the key(s) are valid and the mobile device 108 is allowed to access the asset protected by the reader 112), then the reader 112 may initiate one or more actions to enable the holder/user 102 of the mobile device 108 to access the asset protected by the reader 112.

The mobile device 108 is shown to include computer memory 304 that stores one or more Operating Systems (O/S) 308 and a key vault 312, among other items. The mobile device 108 is also shown to include a processor 316, one or more drivers 320, a user interface 324, a reader interface 328, a network interface 332, and a power module 336. Suitable examples of a mobile device 108 include, without limitation, smart phones, PDAs, laptops, PCs, tablets, netbooks, wearable devices, and the like.

The memory 304 may correspond to any type of non-transitory computer-readable medium. In some embodiments, the memory 304 may comprise volatile or non-volatile memory and a controller for the same. Non-limiting examples of memory 304 that may be utilized in the mobile device 108 include RAM, ROM, buffer memory, flash memory, solid-state memory, or variants thereof.

The O/S 308 may correspond to one or multiple operating systems. The nature of the O/S 308 may depend upon the hardware of the mobile device 108 and the form factor of the mobile device 108. The O/S 308 may be viewed as an application stored in memory 304 that is processor-executable. The O/S 308 is a particular type of general-purpose application that enables other applications stored in memory 304 (e.g., a browser, an email application, an SMS application, etc.) to leverage the various hardware components and driver(s) 320 of the mobile device 108. In some embodiments, the O/S 308 may comprise one or more APIs that facilitate an application's interaction with certain hardware components of the mobile device 108. Furthermore, the O/S 308 may provide a mechanism for viewing and accessing the various applications stored in memory 304 and other data stored in memory 304.

The processor 316 may correspond to one or many microprocessors that are contained within the housing of the mobile device 108 with the memory 304. In some embodiments, the processor 316 incorporates the functions of the user device's Central Processing Unit (CPU) on a single Integrated Circuit (IC) or a few IC chips. The processor 316 may be a multipurpose, programmable device that accepts digital data as input, processes the digital data according to instructions stored in its internal memory, and provides results as output. The processor 316 implements sequential digital logic as it has internal memory. As with most known microprocessors, the processor 316 may operate on numbers and symbols represented in the binary numeral system.

The driver(s) 320 may correspond to hardware, software, and/or controllers that provide specific instructions to hardware components of the mobile device 108, thereby facilitating their operation. For instance, the user interface 324, reader interface 328, and network interface 332, may each have a dedicated driver 320 that provides appropriate control signals to effect their operation. The driver(s) 320 may also comprise the software or logic circuits that ensure the various hardware components are controlled appropriately and in accordance with desired protocols. For instance, the driver 320 of the reader interface 328 may be adapted to ensure that the reader interface 328 follows the appropriate proximity-based protocols (e.g., BLE, NFC, Infrared, Ultrasonic, IEEE 802.11N, etc.) such that the reader interface 328 can exchange communications with the credential. Likewise, the driver 320 of the network interface 332 may be adapted to ensure that the network interface 332 follows the appropriate network communication protocols (e.g., TCP/IP (at one or more layers in the OSI model), UDP, RTP, GSM, LTE, Wi-Fi, etc.) such that the network interface 332 can exchange communications via the communication network 128. As can be appreciated, the driver(s) 320 may also be configured to control wired hardware components (e.g., a USB driver, an Ethernet driver, etc.).

As mentioned above, the user interface 324 may comprise one or more user input devices and/or one or more user output devices. Examples of suitable user input devices that may be included in the user interface 324 include, without limitation, buttons, keyboards, mouse, touch-sensitive surfaces, pen, camera, microphone, etc. Examples of suitable user output devices that may be included in the user interface 324 include, without limitation, display screens, touchscreens, lights, speakers, etc. It should be appreciated that the user interface 324 may also include a combined user input and user output device, such as a touch-sensitive display or the like.

The reader interface 328 may correspond to the hardware that facilitates communications with the credential for the mobile device 108. The reader interface 328 may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the reader interface 328 is specifically provided to facilitate proximity-based communications with a credential via communication channel or multiple communication channels.

The network interface 332 may comprise hardware that facilitates communications with other communication devices over the communication network 128. As mentioned above, the network interface 332 may include an Ethernet port, a Wi-Fi card, a Network Interface Card (NIC), a cellular interface (e.g., antenna, filters, and associated circuitry), or the like. The network interface 332 may be configured to facilitate a connection between the mobile device 108 and the communication network 128 and may further be configured to encode and decode communications (e.g., packets) according to a protocol utilized by the communication network 128.

The power module 336 may include a built-in power supply (e.g., battery) and/or a power converter that facilitates the conversion of externally-supplied AC power into DC power that is used to power the various components of the mobile device 108. In some embodiments, the power module 336 may also include some implementation of surge protection circuitry to protect the components of the mobile device 108 from power surges.

Figure 4:
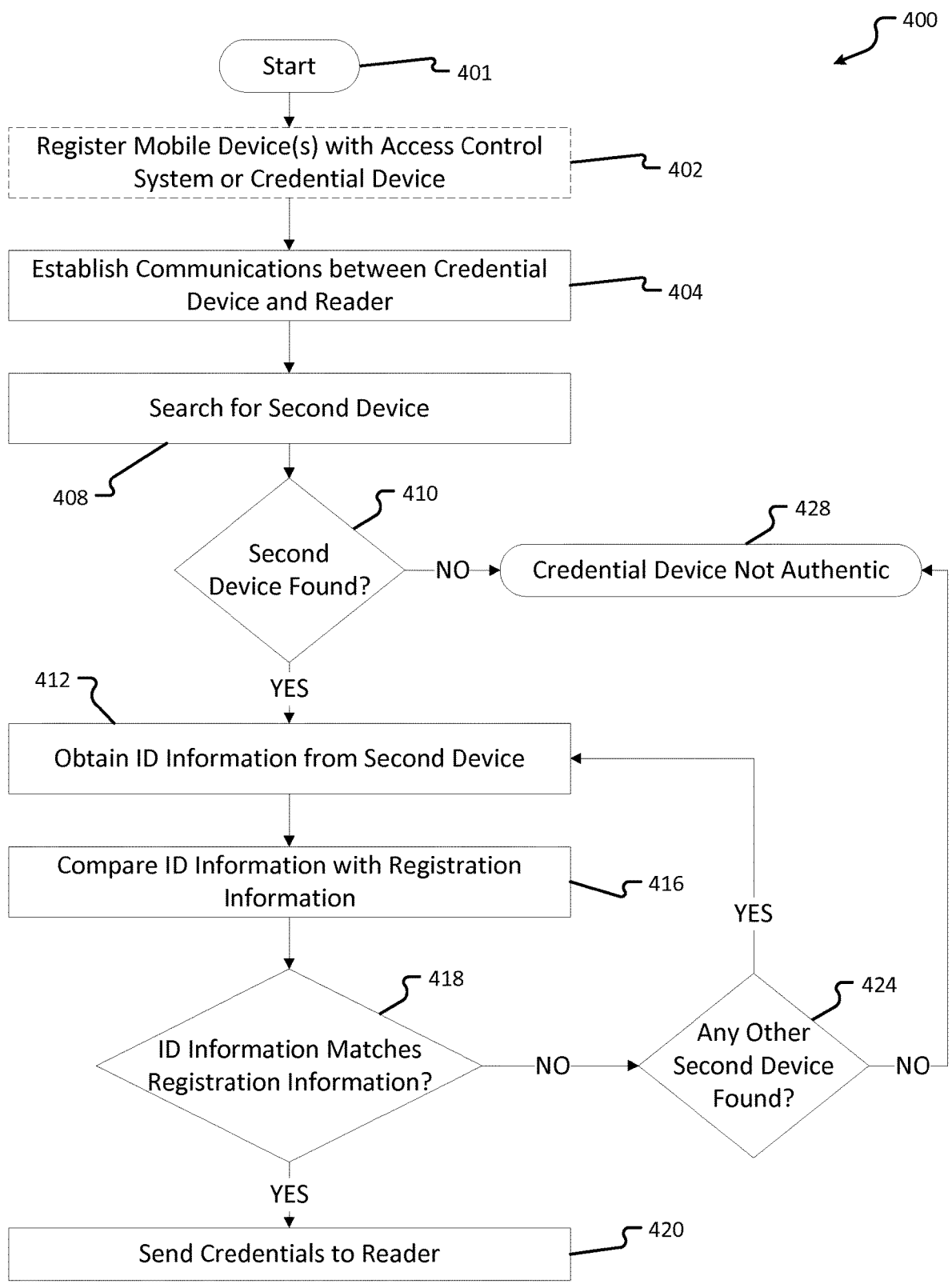
FIG. 4 is a flowchart depicting a method of utilizing discovery of a second device for authentication.
Figure 5:
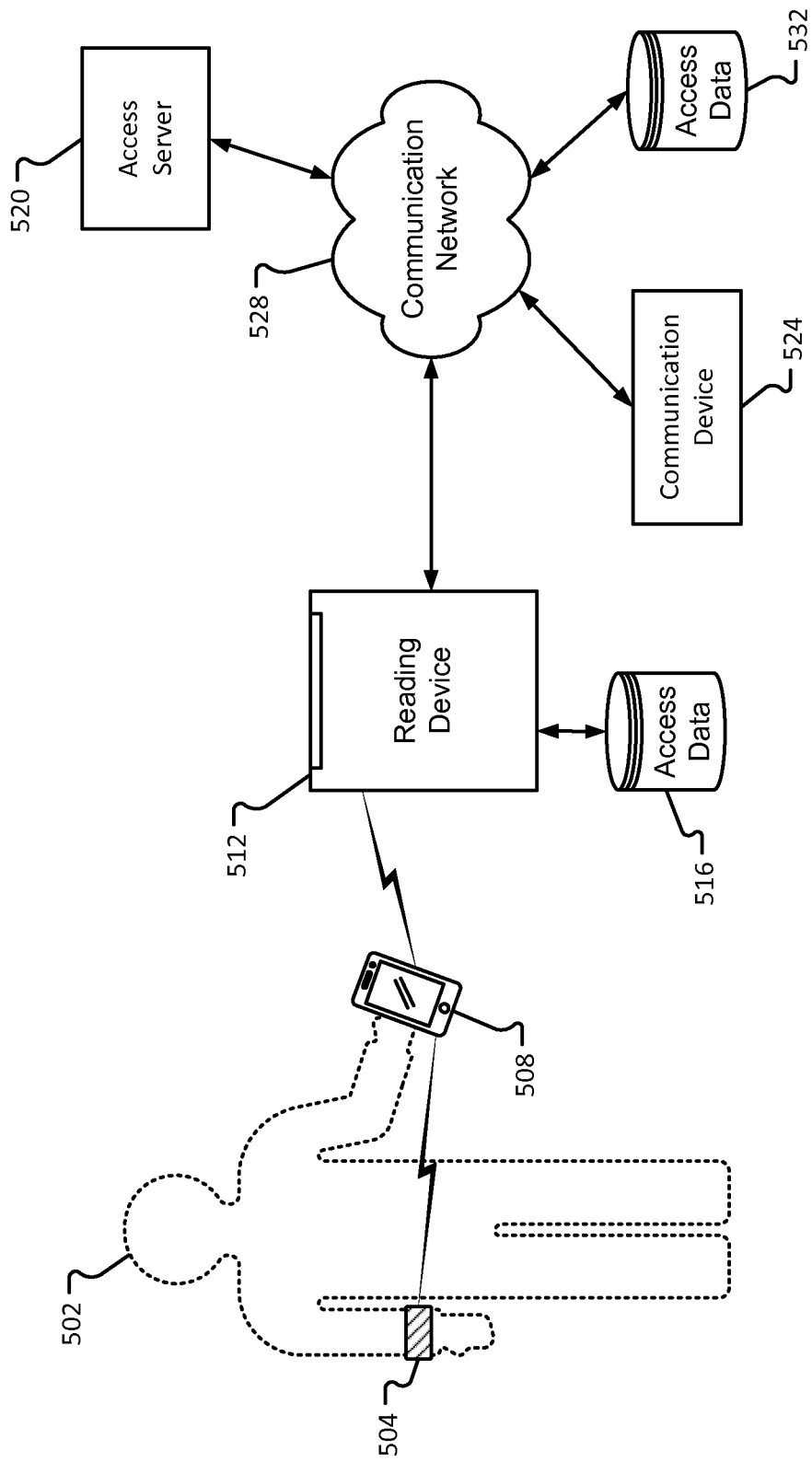
FIG. 5 is a diagram depicting an access control system in accordance with other embodiments of the present disclosure.

FIG. 4 depicts a process 400 of using second-device discovery for authentication purposes, and FIG. 5 depicts a system in which the process 400 may be utilized. FIGS. 4 and 5 will be described together below to aid in understanding the present disclosure. As an overview, however, in embodiments of the present disclosure a credential device 508 may be a smartphone having the same or similar components as described above with respect to smart phone 108, and a second device 504 may be a wearable mobile device in the form of a watch, having the same or similar components as described above with respect to wearable device 104. The credential device or smartphone 508 may communicate with the second device or watch 504 using a Bluetooth or BLE protocol, and the smartphone 508 may communicate with the reader 512 using the same or a different wireless communication protocol. Once the smartphone 508 is presented to the reader 512, the smartphone 508 initiates a discovery process 400 to verify the presence of the watch 504. The discovery process may include obtaining certain information from or about the watch 504. If the discovery process is successful, then the smartphone 508 provides a mobile key stored in its key vault 312 (e.g.

its credentials) to the reader 512, allowing the reader 512 to evaluate the mobile key and make an access control determination.

The process 400 of utilizing second device discovery for authentication begins with a one-time and potentially optional step 402 of registering with an access control system (e.g. with a reader 512 or an access server 520) any mobile devices of the user 502 that may be used as a second device for authentication purposes. In the present example, the user 502 registers at least watch 504. The registered device(s) may or may not include the credential device 508, in the key vault 312 of which credentials for obtaining access to an access-controlled resource are stored. In embodiments, such a device may not need to be registered or may have been registered upon receipt of credentials for the access control system.

Once the mobile device(s) of the user 502 are registered with the access control system, registration need not be repeated unless the user 502 stops using a registered mobile device (including a registered wearable device) or obtains a new mobile device.

Device registration may occur in a variety of ways. For example, the access control system (including any component thereof, such as reader 512 or access server 520) may be in communication with or utilize a communication network 528 (e.g. the Internet) and may be configured to receive registration information via the communication network 528, including information about any mobile device such as watch 504 that may be used in combination with a credential device such as smart phone 508 to establish that the user 502 is authorized to access the resource protected by the reader 512. For example, a user 502 might register with the access control system, in addition to watch 504, a smart phone (other than smart phone 508), a fitness tracking bracelet, and a tablet, and may then use any of these devices in combination with a credential device to satisfy the second-device discovery authentication process of the access control system. Alternatively, the user 502 may only be able to use a particular mobile device (and perhaps even a particular wearable device, such as watch 504) in combination with the credential device 508 for authentication purposes.

In other embodiments, device registration may occur by placing a reader 512 of the access control system in a registration mode, and causing the reader 512 to communicate, whether directly or indirectly, with each device to be registered, including watch 504. The reader 512 may then cause identification information corresponding to each such device to be stored for future access by the reader 512 (e.g. in access data memory 516) while in access control mode. In embodiments, only an administrator of the access control system is able to toggle or switch the reader 512 between device registration mode and normal access control mode.

In still other embodiments, a user 502 may install an application or other software/instruction set in the memory 304 of his or her credential device 508, and may register other mobile devices (including wearable devices) with the application or other software on the credential device 508. The application or software may store the registration information in the memory 304 of the credential device 508, and may or may not communicate the registration information to the access control system. In such embodiments, when the credential device 508 is used in an attempt to gain access to a resource protected by an access control system, the application or other software may determine whether a registered second device (here, watch 504) is present before allowing the credential device 508 to engage in one or more required communications with a reader 512, such as the presentation of credentials by the credential device 508 to the reader 512. For example, the application or other software may be configured to allow credentials stored in the key vault 312 of the credential device to be transmitted to the reader 512 only if the application or other software determines, based on signals received by the credential device 508, that the second device 504 is in relatively close physical proximity to the credential device 508. Whether the second device 504 is in relatively close physical proximity to the credential device 508 may depend, for example, on whether the second device 504 is within a predetermined proximity to the credential device 508, whether the second device 504 is within communication range of the credential device 508, or whether the second device 504 is within configurable range of the credential device 508.

Device registration information for each user 502 may be stored in a central memory 532 of the access control system, and/or may be distributed to the access data memory 516 of each of one or more readers of the access control system, or may be stored in any other location accessible to the reader or readers of the access control system that will need to determine whether to grant access to the user based, at least in part, on the presentation by the user 502 of a credential device 508 and a second device 504.

After the second devices of a user 502 have been registered with the access control system, the registered second devices may be used (together with the credential device 508) to gain access to the resource protected by the access control system (which may or may not have additional requirements beyond the presentation to a reader 112 of the access control system of a credential device and registered second device). This involves several steps. In step 404, a credential device 508 establishes communications with the reader 512. The establishment of communications may be triggered by the physical proximity of the credential device 508 to the reader 512 (as determined, e.g., by the credential device 508 and/or the reader 512, using received signal strength indication (RSSI) information, time-of-flight information, or other available information and known methods). The establishment of communications may also be triggered by the physical proximity of the user 502 to the reader 512, an access point associated with the reader 512, or a sensor associated with the access point and/or reader 512 (as determined, e.g., using proximity sensors, rangefinders, pressure sensors, or other such sensors). Thus, for example, when the user 502 is in physical proximity to the reader 512 or an associated access point or sensor, the reader 512 may broadcast a signal in an attempt to establish communications with a credential device 508 of the user 502. Alternatively one or both of the credential device 508 and the reader 512 may periodically broadcast signals that, when received by another device, confirm that the sending and receiving devices are within communication range of each other such that communications may be initiated. As another alternative, the establishment of communications may be initiated manually, whether by tapping the credential device 508 against the reader 512, moving the credential device 508 according to a predetermined sequence of motions, or by inputting an instruction through a user interface associated with the credential device 508 or the reader 512 that causes the credential device 508 or the reader 512 to initiate communications with another device.

Once communications between the credential device 508 and the reader 512 have been established, the credential device 508 may be authenticated before the reader 512 will accept or review credentials from the credential device 508.

According to embodiments of the present disclosure, the authentication process includes discovery of a registered second device 104. Thus, the credential device 508 (or, in embodiments, the reader 512) initiates the discovery of the registered second device 104 by searching for any second device (step 408). The purpose of this searching step is to identify any devices within communication range that may correspond to registered second devices.

Some second devices may be capable of communicating directly with the reader 512. Particularly when one or more registered second devices are capable of communication with the reader 512 (which information may be determined or provided during the registration process), the reader 512 may itself search for second devices during step 408. However, when the registered second devices are not capable of direct communication with the reader 512, or when the ability of the registered second devices to communicate directly with the reader 512 is unknown, then the credential device 508 may be used to search for second devices on behalf of the reader 512, whether at the request or command of the reader 512. When the reader 512 is involved in the searching, the reader 512 may commence searching once it has established communications with the credential device 508. When the credential device 508 is involved in the searching, the credential device 508 may commence searching at the request or command of the reader 512, or may be configured to commence searching automatically once communications with a reader 512 have been established.

The searching may comprise broadcasting signals from the credential device 508 or the reader 512, and listening (e.g. with a wireless receiver of the credential device or reader 512) for responsive signals from a second device. When the searching is conducted by the credential device 508, the searching may comprise determining whether the credential device 508 is currently paired with any second devices. The searching may comprise simply waiting to receive, via a wireless receiver of the credential device 508 or the reader 512, one or more signals from a second device. For example, the searching may comprise waiting for NFC communication from a second device, such that, for example, the second device must be tapped on the credential device 508 or on the reader 512 to be discovered by the credential device 508 or the reader 512.

If one or more second devices 504 are found (step 410), then the credential device 508 or reader 512 initiates communications with the second device 504 and obtains (or at least attempts to obtain) information therefrom that may be used to determine whether the second device 504 has been registered (step 412). If a second device is not found, then the credential device 508 or the reader 512 determines that the credential device 508 is not authentic (step 428), and the access control attempt terminates.

In step 412, the credential device 508 or reader 512 may request identification information from each identified second device 504, such as a device ID (e.g. a device serial number, or a name assigned to the device by the user 502), device type, device specifications, and so forth. When the credential device 508 has been used for searching on behalf of the reader 512, the credential device 508 may send information that the credential device 508 receives from the second device 504 to the reader 512 (if the second device 504 is in fact within communication range of the credential device 508) and vice versa.

If the credential device 508 or the reader 512 receives identification information from the second device 504, then the credential device 508 or reader 512 uses the information to verify that the second device 504 is a registered device (step 416). In this step, the credential device 508 or reader 112 compares the received information to stored registration information. If the received information matches the stored registration information (step 418), then the credential device 508 or reader 512 concludes that the identified second device 504 is a registered second device, and that the credential device 504 is authentic. If in step 418 the received information does not match the stored registration information, then the credential device 508 or the reader 512 concludes that the identified second device 504 is not a registered second device. In this latter instance, the reader 512 or credential device 508 determines whether any other second device has been found (step 424), and, if so, returns to step 412 to determine whether that second device is a registered device. If not, then the reader 512 or credential device 508 concludes that the credential device 508 is not authentic (step 428) and terminates the access attempt.

As noted above, a credential device 508 may be used to determine whether an identified second device 504 is a registered second device by comparing information received from the second device 504 with stored registration information. If the registration of the second device 504 took place on the credential device 508, then the registration information may already be stored on the credential device 508 (or in a computer-readable storage medium accessible to the credential device 508), such that the credential device 508 can make the comparison without receiving any information from the reader 512 or from another component of the access control system (e.g. access server 520, access data memory 532). In such embodiments, the same app or software on the credential device 508 that allows for registration of second devices may be used to verify that a registered second device is present, and may further control whether and when the credential device 508 may release credentials from its key vault 312 to a reader 512. Thus, the authentication decision (at least to the extent it is based on second device discovery) may be made by the credential device 508 itself. In other embodiments, the credential device 508 may provide both the registration information and the received information about an identified second device 504 to the reader 512, such that the reader 512 can compare the registration information with the received information and determine whether the credential device 508 is authentic. In these embodiments, the registration information need not be provided to the access control system at the same time as the received information. For example, the registration information may be provided to the access control system (e.g., via a communication network accessible to both the credential device 508 and the access control system, such as communication network 528, or using any other known method of transferring computer-readable data) upon completion of the registration process, and the received information may not be provided to the access control system (or any component thereof, including a reader 512) until the credential device 508 is used in an attempt to gain access to the resource protected by the access control system.

In other embodiments, the registration information may be stored by the access control system, but the reader 512 may not be capable of communication with the second device 504. In such instances, the credential device 508 may send the information received from the second device 504 to the reader 512, such that the reader 512 can compare the received information with the registration information and make an authentication decision. Alternatively, the reader 512 may send the registration information to the credential device 508, such that the credential device 508 can compare the received information with the registration information and make an authentication decision. The latter alternative may be particularly useful when a reader 512 has less processing power or capabilities (e.g., runs on a battery, has limited or no RAM, etc.) than the credential device 508, which may therefore be better suited for making the comparison and the authentication decision.

While the present disclosure encompasses the use of a credential device 508 to determine whether an identified second device 504 is a registered second device, persons of ordinary skill in the art will understand, based on the present disclosure, that any app or other software used to make that determination must be protected by one or more security features to ensure that an unauthorized holder of the credential device 508 cannot modify the app or software to obtain a successful authentication result in the absence of a registered second device. Security features useful for this purpose are known in the art and are not further discussed herein.

As persons of ordinary skill in the art will appreciate, authentication may include other aspects beyond those described herein regarding second device discovery. Thus, in addition to the second device discovery requirement, additional authentication may be required. Such authentication may include the exchange of one or more digital certificates, digital signatures, passwords, or the like between the credential device 508 and the reader 512. Second device discovery may be incorporated into known forms of authentication, including challenge-response authentication. Second device discovery may also be used as one factor in a two-factor authentication process.

Once a credential device 508 is successfully authenticated using at least the second device discovery technique described herein, then the credential device 508 sends its stored credentials to the reader 512 (step 420). The reader 512 can then evaluate the stored credentials and determine whether the credential device 508 is authorized to access the resource protected by the access control system of which the reader 512 is a part, and grant or deny access to the protected resource based on that determination.

Variations on the foregoing description of utilizing discovery of a second device for authentication purposes are encompassed with the scope of the present disclosure. In some embodiments, for example, the discovery process may occur shortly before any communications between the credential device 508 and the reader 512. In these embodiments, the second device discovery process may be triggered manually (e.g. by opening an access control app on the credential device 508), or it may be triggered by information obtained from one or more sensors on the credential device (e.g. if a wireless radio on the credential device 508 detects and/or connects to a wireless network known to be in the vicinity of the reader 512, or to which the reader 512 itself is connected, such as an office wireless network, or if a GPS on the credential device 508 indicates that the credential device 508 is within a pre-defined perimeter around the reader 512). In other embodiments, the discovery process between the credential device 508 and the second device 504 need not occur in close temporal proximity to the time at which the credential device 508 is presented to the reader 512, but must have occurred within a predetermined amount of time before the credential device 508 is presented to the reader 512.

In further embodiments, the credential device 508 may be configured to require evidence that the second device 504 is in close proximity to the credential device 508 (e.g. recent receipt of a communication from the credential device 508 using a relatively short-distance communication protocol, such as NFC, Bluetooth, or BLE, or a current pairing or bonding between the credential device 508 and the second device 504).

In still other embodiments, the credential device 508 is required to authenticate with the second device 504, whether as part of the overall authentication process or before the credential device 508 is presented to the reader 512 for authentication. In the latter instance, the credential device 508 may also be required to have received one or more communications from the second device 504 after successful authentication, whether in the interim between authentication and presentation of the credential device 508 to the reader 512 or immediately after the credential device 508 is presented to the reader 512. Alternatively, the credential device 508 may be configured to rely on an earlier successful authentication only if the authentication was part of a pairing process between the credential device 508 and the second device 504, and further provided that the credential device 508 and the second device 504 are still paired or bonded when the credential device 508 is presented to the reader 512.

Figure 6:
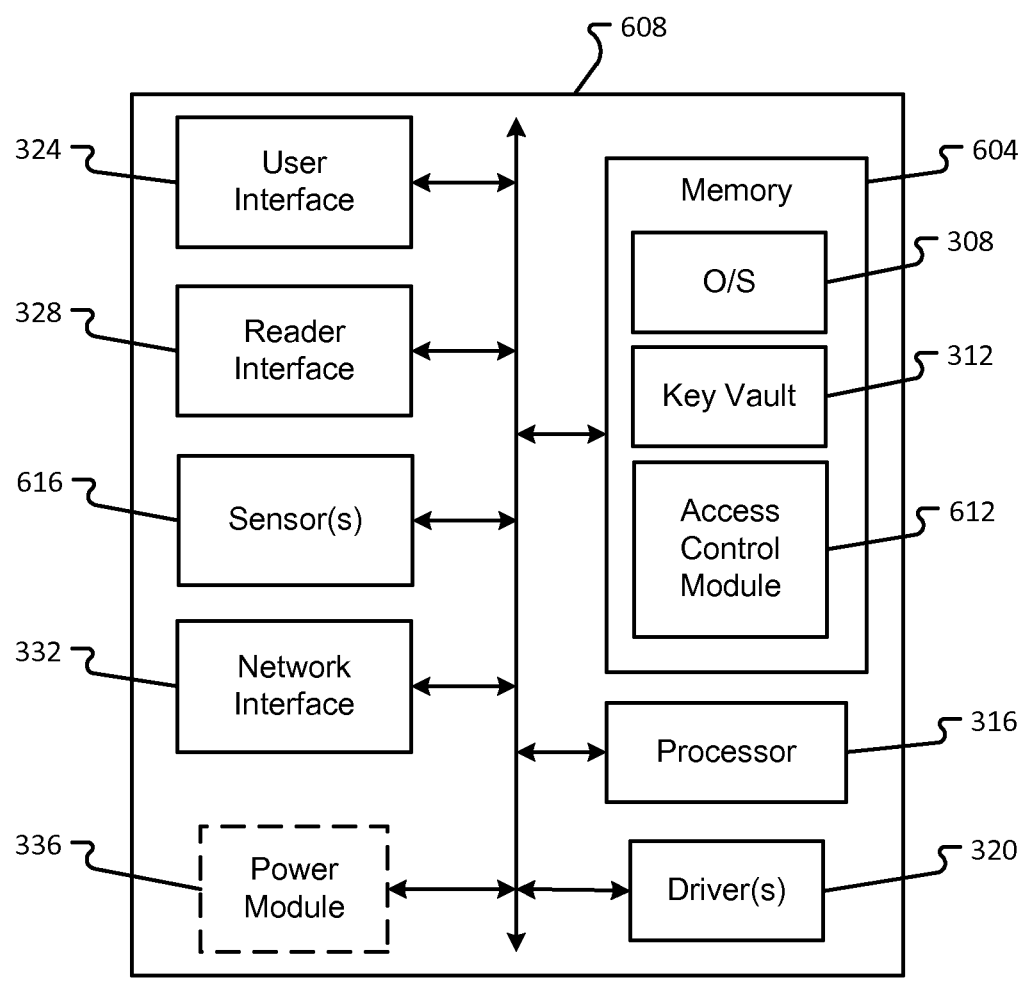
FIG. 6 is a block diagram depicting a credential device or components thereof in accordance with embodiments of the present disclosure.

Referring now to FIG. 6, in some embodiments, a credential device 608 has instructions stored in a memory 604 for execution by the processor 316, including an access control module 612 configured to make an access control decision which the credential device 608 wirelessly communicates to a reader such as reader 112 or 512. The reader then grants or denies access to the user of the credential device 608 based on the access control decision.

In these embodiments, the access control module 612 includes instructions for making an access decision based on at least information from or about a reader 112 or 512, information from or about a second device such as second device 504, and the mobile key stored in the key vault 312. The second device may be any device capable of communicating with the credential device 608, including a wearable mobile device or a non-wearable mobile device. The information from or about the reader 112 or 512 may be or include, for example, a list of authorized mobile keys, a schedule correlating mobile keys with authorized access times, a serial number or other identification number, information corresponding to a public key (e.g. a public key, a public key handle), information corresponding to a public certificate (e.g., a public general certificate that allows validation of a public key specific to the reader 112 or 512), and/or a timestamp. This information may be read from the reader 112 or 512 by the credential device 608, or it may be wirelessly sent from the reader 112 or 512 to the credential device 608. The credential device 608 may read or receive the information as soon as it is within communication range of the reader 112 or 512, or after some other triggering event. The access control module 612 uses the information to determine whether the credential device 608 is authorized to access the protected resource associated with the reader 112 or 512. The access control module 612 may consider the mobile key stored in the key vault 312 of the credential device 608 when making this determination, or it may consider the mobile key separately.

In addition to considering information from the reader 112 or 512 and the mobile key, the access control module 612 also considers information from or about the second device. This information may be an indication of whether the credential device 608 has successfully authenticated with the second device. The authentication requirement may be satisfied if successful authentication occurred during a predetermined time period preceding the access control determination, or it may be satisfied only if successful authentication occurs during or as part of the access control determination. The information may be an indication of whether the credential device 608 is presently paired or bonded to the second device, or was recently paired or bonded to the second device. The information may correspond to a public key (e.g. a public key, a public key handle) or to a public certificate (e.g., a public general certificate that allows validation of a public key specific to the second device). Additionally or alternatively, the access control module 612 may consider information from or about the second device that is unrelated to authentication in making the access control decision. The information may be information already known to the credential device 608, such as information about when the credential device 608 last received a communication from the second device, or it may be information read or received from the second device (such as identification information, location information, biometric information, a timestamp, etc.). The access control module 612 may compare the information from or about the second device with information stored in the memory 604 of the credential device 608, or with information obtained from one or more sensors 616 on the credential device 608, in making an access control decision. For example, if the credential device 608 and the second device both have sensors such as sensors 616 capable of measuring heart rate, then the access control module 612 may compare heart rate information read or received from the second device with heart rate information from the heart rate sensor of the credential device 608.

If the access control module 612 determines that the credential device 608 is authorized to access the protected resource associated with the reader 112 or 512, that the mobile key is valid, and that any requirements associated with the second device have been satisfied, then the access control module 612 sends a grant access message to the reader 112 or 412, and the reader 112 or 512 unlocks or otherwise opens the access point to the protected resource in question. If the access control module 612 determines that the credential device 608 is not authorized to access the protected resource, or that the mobile key is not valid, or that any requirements associated with the second device have not been met, then the access control module 612 either sends a deny access message to the reader 112 or 512 or simply does not send a grant access message to the reader 112 or 512, such that the reader 112 or 512 does not unlock or otherwise open the access point to the protected resource.

Again, many variations of the above-described embodiments are possible without departing from the scope of the present disclosure. In addition to the variations already described herein, other variations may be implemented. For example, successful discovery of the second device by the credential device 608 may be a prerequisite to any communications between the credential device 608 and the reader 112 or 512. Or, successful discovery of the second device by the credential device 608 may be required before the access control module 612 is permitted to access the key vault 312, where the mobile key is stored. In some embodiments, the access control module 612 may consider only one or two of information from or about the reader 112 or 512, information from or about the second device, and the mobile key.

As mentioned above, in some embodiments of the present disclosure, a mobile key is locked in a digital key vault 312 within the memory 304 or 604 of a credential device 508 or 608. In embodiments, the digital key vault 312 is only unlocked when one or more requirements associated with a second device are satisfied. For example, the digital key vault 312 may be opened after successful discovery of the second device. The key vault 312 may remain open for a predetermined period of time thereafter (e.g. five or ten minutes), or until a predetermined criterion is satisfied (e.g. until the mobile key has been provided to an access control module such as access control module 612 within the credential device 608 or to a reader, or until a predetermined period of time has passed since the last communication between the credential device and the second device, or until the credential device and the second device are no longer paired or bonded). As long as the digital vault 312 is locked, the mobile key cannot be accessed (whether by an access control module within the credential device or by a reader or other device attempting to read from the memory of the credential) or transmitted from the credential device to a reader or other device According to other embodiments of the present disclosure, a credential device's mobile key is kept in a dedicated memory that is physically separate from all other memory within the credential device. The contents of the dedicated memory (e.g. the mobile key) can only be read or otherwise accessed if a physical switch between the memory and one or more other credential device components (e.g. a processor) is closed. In its default state, the switch remains open. However, the switch closes when a predetermined requirement associated with a second device is satisfied. The predetermined requirement may be successful discovery of the second device, or successful authentication with the second device. Persons of ordinary skill in the art will recognize that many other predetermined requirements are possible, including other requirements discussed herein in connection with other embodiments. Once the switch is closed, it may remain closed for a predetermined period of time, or until a predetermined event has occurred.

The exemplary systems and methods of this disclosure have been described in relation to wearable devices, systems, and methods in an access control system. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein. Moreover, it should be appreciated that the methods disclosed herein may be executed via a wearable device, a mobile device, a reading device, a communication device, and/or an access server of an access control system, etc.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In other embodiments, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Any of the steps, functions, and operations discussed herein can be performed continuously and automatically.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

What is claimed is:

1. A credential device for an access control system, comprising:
    a first communication interface enabling the credential device to communicate with an access control reader;
    a second communication interface enabling the credential device to communicate with a second device;
    a first memory comprising a key vault and storing a mobile key, the first memory physically separate from all other memory in the credential device;
    a second memory containing instructions configured to:
    enable registration of the second device with the access control system;
    establish communications with the access control reader;
    broadcast a search signal via the second communication interface;
    receive a response to the search signal from the second device, wherein the response comprises a device ID associated with the second device;
    compare the device ID received in the response with stored registration information;
    determine that the device ID received in the response substantially matches the stored registration information;
    in response to determining that the device ID received in the response substantially matches the stored registration information, determine that the second device is registered with the access control system;
    allow the mobile key to be retrieved from the key vault and transmitted to the access control reader via the first communication interface only after determining that the second device is registered with the access control system; and
    make an access decision based on at least information from or about the access control reader, wherein the information from or about the access control reader comprises at least one of: a serial number, another identification number, a timestamp, a list of authorized credential devices, information corresponding to a public key, information corresponding to a public certificate, and a schedule correlating mobile keys with authorized access times; and
    a processor configured to execute the instructions stored in the second memory.

2. The credential device of claim 1, wherein the mobile key is only allowed to be retrieved from the key vault after a predetermined requirement relating to the second device is satisfied via the second communication interface, wherein the predetermined requirement relating to the second device is one or more of:
    the credential device must successfully communicate with the second device;
    the credential device must successfully authenticate with the second device;
    the credential device must receive predetermined information from the second device;
    the credential device must be presently paired or bonded with the second device;
    biometric information received from the second device must match biometric information obtained from a biometric sensor in the credential device; and
    biometric information received from the second device must match biometric information stored in the memory of the credential device.

3. The credential device of claim 2, wherein the instructions are further configured to cause the credential device to transmit the mobile key to the access control reader only if the predetermined requirement relating to the second device is satisfied within a predetermined period of time after the credential device initiates communications with the access control reader.

4. The credential device of claim 1, wherein the second device is a wearable mobile device.

5. The credential device of claim 1, wherein the second communication interface uses a Bluetooth communication protocol.

6. The credential device of claim 1, wherein the credential device and the second device each comprise operating systems that enable telecommunication functions or features.

7. The credential device of claim 1, wherein the credential device is capable of pairing with the second device.

8. The credential device of claim 1, wherein the key vault prevents access to the mobile key in a default state.

9. A system, comprising:
    a credential device comprising:
    a first communication interface for communicating with an access control reader;
    a second communication interface for communicating with a second device;
    a first memory comprising a key vault storing a mobile key, the first memory physically separate from all other memory in the credential device;
    a second memory storing an access control module, the access control module comprising instructions configured to:
    enable registration of the second device with an access control system;
    establish communications with the access control reader;
    broadcast a search signal;
    receive a response to the search signal from the second device, wherein the response comprises a device ID associated with the second device;
    compare the device ID received in the response with stored registration information;

determine that the device ID received in the response substantially matches the stored registration information;

in response to determining that the device ID received in the response substantially matches the stored registration information, determine that the second device is registered with the access control system;

allow retrieval of the mobile key from the first memory only upon determining that the second device is registered with the access control system; and make an access decision based on at least information from or about the access control reader, information from or about the second device, and the mobile key, wherein the information from or about the access control reader comprises at least one of: a serial number, another identification number, a timestamp, a list of authorized credential devices, information corresponding to a public key, information corresponding to a public certificate, and a schedule correlating mobile keys with authorized access times;

a processor for executing the instructions in the access control module.

10. The system of claim 9, wherein the information from or about the second device is at least one of: an indication of whether the credential device has successfully authenticated with the second device, the time of the most recent communication between the credential device and the second device, whether the credential device is presently paired or bonded to the second device, whether the credential device was recently paired or bonded to the second device, information identifying the second device, location information, biometric information, information corresponding to a public key, information corresponding to a public certificate, and a timestamp.

11. The system of claim 9, wherein the instructions are further configured to compare the information from or about the second device with information stored in the first memory or the second memory.

12. The system of claim 9, wherein the instructions are further configured to make an access granted decision only if the information from or about the second device indicates that the second device is within a predetermined proximity to the credential device.

13. The system of claim 9, wherein the instructions are further configured to cause the credential device to transmit the access decision to the access control reader via the first communication interface.

14. A method for use in connection with a credential device, comprising:

using a first wireless communication interface to enable communications between the credential device and a reader of an access control system, the credential device comprising a dedicated memory that comprises a key vault in which a mobile key is stored, the dedicated memory physically separate from all other memory in the credential device;

using a second wireless communication interface to enable communications between the credential device and a wearable device;

enabling registration of the wearable device with the access control system;

establishing communications with the reader;

broadcasting a search signal via the second wireless communication interface;

receiving a response to the search signal from the wearable device, wherein the response comprises a device ID associated with the wearable device;

comparing the device ID received in the response with stored registration information;

determining that the device ID received in the response substantially matches the stored registration information;

in response to determining that the device ID received in the response substantially matches the stored registration information, determining that the wearable device is registered with the access control system;

conditioning retrieval of the mobile key from the dedicated memory and transmission of the mobile key from the credential device to the reader via the first wireless communication interface upon determining that the wearable device is registered with the access control system; and making an access decision based on at least information from or about the access control reader, wherein the information from or about the access control reader comprises at least one of: a serial number, another identification number, a timestamp, a list of authorized credential devices, information corresponding to a public key, information corresponding to a public certificate, and a schedule correlating mobile keys with authorized access times.

15. The method of claim 14, wherein the second wireless communication interface comprises at least one of a near field communication interface or a Bluetooth interface.

16. The method of claim 14, wherein the wearable device transmits information to the credential device via the second wireless communication interface and wherein the credential device transmits the information received from the wearable device to the reader via the first wireless communication interface.

17. The method of claim 14, wherein the reader further comprises memory that further stores instructions for causing the reader to generate one or more wearable device discovery signals and to transmit the one or more wearable device discovery signals to the wearable device via the credential device.

18. The method of claim 14, further comprising:

using a third wireless communication interface to enable communications between the wearable device and the reader.

19. The method of claim 14, wherein the mobile key is only allowed to be retrieved from the key vault after a predetermined requirement relating to the wearable device is satisfied via the second wireless communication interface, wherein the predetermined requirement comprises determining that the wearable device and the credential device are paired to one another and are capable of communicating information to one another via the second wireless communication interface.

* * * * *